US010758976B2

(12) United States Patent
Dial et al.

(10) Patent No.: US 10,758,976 B2
(45) Date of Patent: Sep. 1, 2020

(54) SYSTEMS AND METHODS FOR POWDER PRETREATMENT IN ADDITIVE MANUFACTURING

(71) Applicant: General Electric Company, Schenectady, NY (US)

(72) Inventors: Laura Cerully Dial, Clifton Park, NY (US); Andrew David Deal, Niskayuna, NY (US); Timothy Hanlon, Glenmont, NY (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 15/629,313

(22) Filed: Jun. 21, 2017

(65) Prior Publication Data
US 2018/0369907 A1 Dec. 27, 2018

(51) Int. Cl.
*B22F 1/00* (2006.01)
*B22F 9/02* (2006.01)
(Continued)

(52) U.S. Cl.
CPC .......... *B22F 1/0014* (2013.01); *B22F 1/0085* (2013.01); *B22F 9/02* (2013.01);
(Continued)

(58) Field of Classification Search
CPC .... B22F 1/0014; B22F 1/0085; B22F 3/1055; B33Y 10/00; B33Y 70/00
See application file for complete search history.

(56) References Cited

U.S. PATENT DOCUMENTS 5,803,992 A * 9/1998 McCallum ............ C22C 1/0441
148/121
7,850,885 B2 12/2010 Philippi et al.
(Continued)

FOREIGN PATENT DOCUMENTS

CN 104889390 * 9/2015

OTHER PUBLICATIONS

Gibson, I. et al. "Additive maufacturing technologies." 2015. p. 267 (Year: 2015).*

*Primary Examiner* — Colleen P Dunn
*Assistant Examiner* — Nicholas A Wang
(74) *Attorney, Agent, or Firm* — Armstrong Teasdale LLP

(57) ABSTRACT

A method of processing a powdered feedstock to form a fabricated component is provided. The fabricated component includes a plurality of grains having a nominal grain size. The method includes providing the powdered feedstock material having a population of phase particulates with a first nominal size distribution disposed within a host matrix material. The method includes building a consolidated component from the powdered feedstock material in an additive manufacturing process, and fabricating the fabricated component from the consolidated component. The first nominal size distribution of the population of phase particulates is sized such that at least a portion of the population of phase particulates persists throughout the additive manufacturing process and is present as a processed population of phase particulates in the consolidated component. In addition, the processed population of phase particulates has a second nominal size distribution effective to produce the nominal grain size of the fabricated component.

17 Claims, 3 Drawing Sheets

VIEW 1

VIEW 2

(51) Int. Cl.
  *B33Y 70/00*    (2020.01)
  *B33Y 40/00*    (2020.01)
  B22F 3/105     (2006.01)
  B33Y 10/00     (2015.01)

(52) U.S. Cl.
  CPC .............. *B33Y 40/00* (2014.12); *B33Y 70/00* (2014.12); *B22F 3/1055* (2013.01); *B22F 2998/10* (2013.01); *B22F 2999/00* (2013.01); *B33Y 10/00* (2014.12)

(56) References Cited

U.S. PATENT DOCUMENTS

| | | |
|---|---|---|
| 7,887,316 B2 | 2/2011 | Cox |
| 8,073,315 B2 | 12/2011 | Philippi |
| 2015/0165545 A1 | 6/2015 | Goehler et al. |
| 2015/0273631 A1 | 10/2015 | Kenney et al. |
| 2015/0306699 A1 | 10/2015 | Honda |

\* cited by examiner

SYSTEMS AND METHODS FOR POWDER PRETREATMENT IN ADDITIVE MANUFACTURING

BACKGROUND

The field of the disclosure relates generally to additive manufacturing systems, and more particularly, to systems and methods for powder pretreatment to control microstructure of components fabricated in an additive system utilizing a powder feedstock.

At least some additive manufacturing systems involve the buildup of a powdered material to make a component. This method can produce complex components from expensive materials at a reduced cost and with improved manufacturing efficiency. At least some known additive manufacturing systems, such as DMLM systems, fabricate components using a laser device, a build platform, and a powder material, such as, without limitation, a powdered metal with a fine array of second phase precipitates, such as carbides, oxides, borides, and topologically close packed (TCP) phases. The laser device generates a laser beam that melts the powder material on the build platform in and around the area where the laser beam is incident on the powder material, resulting in a melt pool. The melt pool cools quickly resulting in fine arrays of second phase precipitates within the fabricated component. The fine arrays of precipitates can result in fine grain sizes, difficulty recrystallizing the alloy, and inferior mechanical behavior, for example creep resistance, with respect to alloys made in a cast form.

BRIEF DESCRIPTION

In one aspect, a method of processing a powdered feedstock material including a plurality of particles to form a fabricated component is provided. The fabricated component includes a plurality of grains having a nominal grain size. The method includes providing the powdered feedstock material. The plurality of particles of the powdered feedstock material includes a population of phase particulates disposed within a host matrix material. The population of phase particulates have a first nominal size distribution. The method also includes building a consolidated component from the powdered feedstock material in an additive manufacturing process, and fabricating the fabricated component from the consolidated component. The first nominal size distribution of the population of phase particulates is sized such that at least a portion of the population of phase particulates persists throughout the additive manufacturing process and is present as a processed population of phase particulates in the consolidated component. Moreover, the processed population of phase particulates has a second nominal size distribution effective to produce the nominal grain size of the fabricated component.

In another aspect, a method of forming a consolidated component including a plurality of grains having a nominal grain size is provided. The method includes atomizing a metal alloy to generate a powdered material including a host matrix material and a population of phase particulates disposed within the host matrix material. The first population of phase particulates have a first nominal size distribution. The method also includes increasing the first nominal size distribution of the population of phase particulates to a second nominal size distribution disposed within the host matrix material. In addition, the method includes directing an energy beam emitted by an energy device onto a layer of the powdered material, and generating a melt pool in the powdered material layer with the energy beam to generate a consolidated component. The energy beam applies insufficient energy to the powdered material to completely melt the population of phase particulates. In addition, the second nominal size distribution of the population of phase particulates is effective to produce the nominal grain size of the consolidated component.

DRAWINGS

These and other features, aspects, and advantages of the present disclosure will become better understood when the following detailed description is read with reference to the accompanying drawings in which like characters represent like parts throughout the drawings, wherein.

Figure 1:
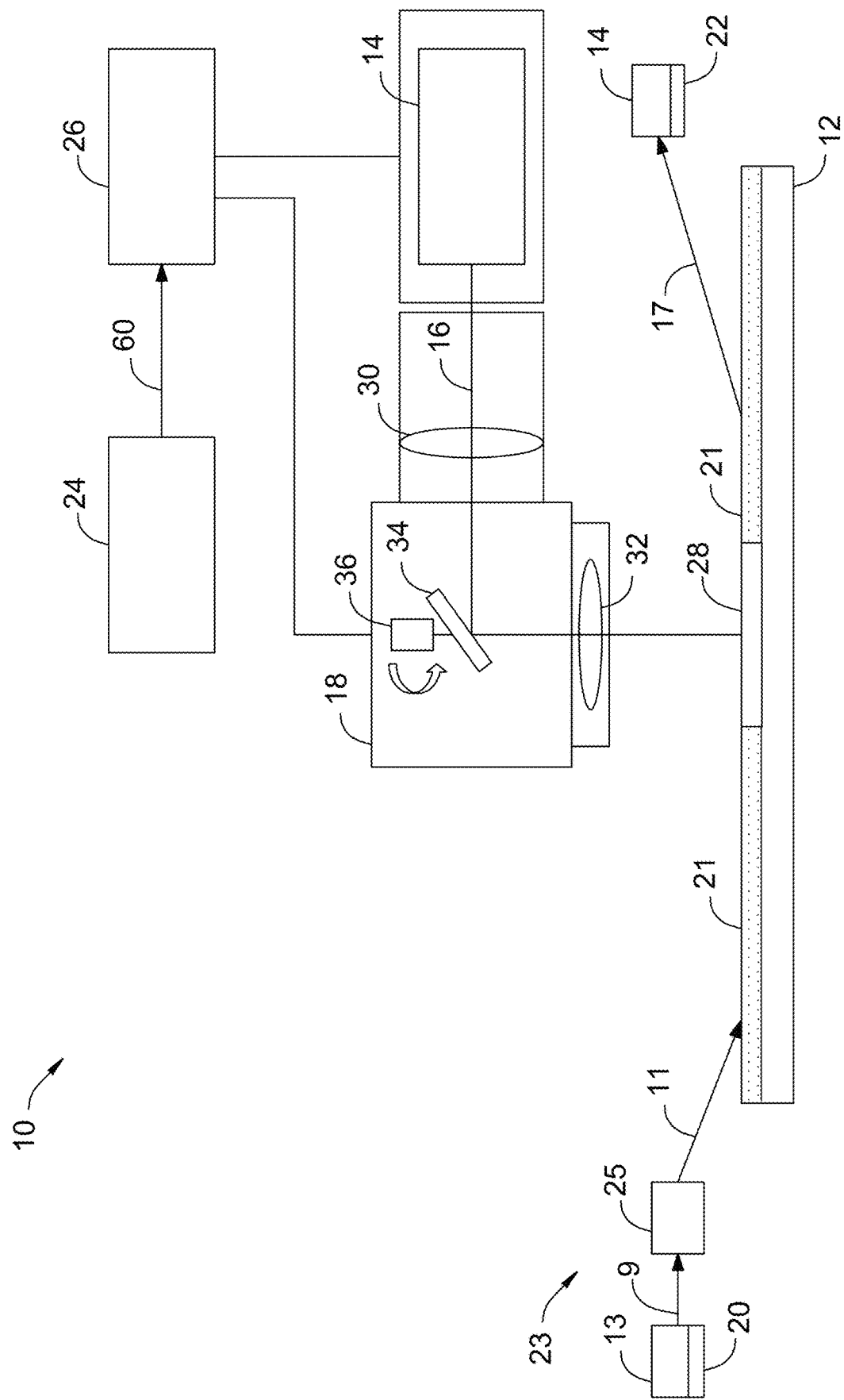
FIG. 1 is a schematic view of an exemplary additive manufacturing system including a pretreatment heating system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of a powdered material pretreatment heating system, for example, for use in an additive manufacturing system, preheat a powdered feedstock material before manufacturing a component from the heat treated powdered feedstock material. The pretreatment heating system applies heat to a powdered feedstock material before the powdered feedstock material is formed into a component to facilitate placing the powdered feedstock material in a condition where one or more phases is present as a dispersion within the microstructure of the powder particles of the powdered feedstock material. Heat treating the powdered feedstock material in the pretreatment heating system enables a predetermined level of second phase particle coarsening and/or generation. Coarsening includes combining of at least some of the second phase particles with other second phase particles to increase the second phase particle size. The second phase particles are of a composition and size such that, when processed for example, in an additive manufacturing system to form a consolidated article, the second phase particles persists throughout the consolidation procedure and is present within the consolidated article. The second phase particles may be altered during the additive manufacturing procedure (e.g., they may partially melt or dissolve such that the particles are smaller on average in the consolidated article than in the powdered feedstock material) but the particles are present within the consolidated article and have a size of the second phase particles that is largely responsible for a grain size of the material (via Zener pinning) after post heat-treatment. Finer size distributions of, for example, oxides and carbides often result in finer grain sizes in the consolidated components post heat-treatment. By coarsening and/or generating such second phase particles within the powder feedstock material prior to consolidating the powder, the final microstructure of the consolidated component can be controlled in a manner that enables increased grain sizes, improved recrystallization of the alloy, and comparable creep behavior with respect to alloys fabricated in a cast form, which is typically unattainable with typical additive manufacturing systems.

FIG. 1 is a schematic view of an exemplary additive manufacturing system 10. In the exemplary embodiment, additive manufacturing system 10 is a direct metal laser melting (DMLM) system. Although the embodiments herein are described with reference to a DMLM system, it is noted that additive manufacturing system 10 can be any powder consolidation process that enables additive manufacturing system 10 to fabricate a component using at least one powdered material. For example, and without limitation, additive manufacturing system 10 can be a Direct Metal Laser Sintering (DMLS) system, a Selective Laser Sintering (SLS) system, a Selective Laser Melting (SLM) system, and an Electron Beam Melting (EBM) system, a binder jet system, or any other additive manufacturing systems requiring a metal powder feedstock.

To make the powdered material, powder particles are first prepared from a base material. Several powder-preparation techniques are known. In inert gas atomization, for example, the base material to be made into powder is melted, and a jet of an inert gas is directed against a stream of the molten metal. Droplets of the molten metal are produced, and these droplets solidify to form the powder particles. Other atomization methods include water atomization, oil atomization, vacuum atomization, plasma atomization, and centrifugal atomization, including processes such as rotating electrode, spinning cup, and rotating disk methods. However produced, the powder particles are thereafter processed to form the component.

In the exemplary embodiment, additive manufacturing system 10 includes a build platform 12, a pretreatment heating system 13, energy device 14 configured to generate an energy beam 16, a first scanning device 18 configured to selectively direct energy beam 16 across build platform 12, energy beam 16 and a post treatment heating system 15. The exemplary additive manufacturing system 10 further includes a computing device 24 and a controller 26 configured to control one or more components of additive manufacturing system 10, as described in more detail herein.

A powdered feedstock material 21 includes a host matrix material including a plurality of particles, and a population of phase particulates disposed within the particles of the host matrix material. The particles include materials suitable for forming a consolidated or solid component 28, including, without limitation, atomized alloys of cobalt (Co), iron (Fe), aluminum (Al), titanium (Ti), nickel (Ni), and combinations thereof. In other embodiments, powdered feedstock material 21 includes any suitable type of powdered feedstock material that enables additive manufacturing system 10 to function as described herein, including, for example and without limitation, ceramic powders, metal-coated ceramic powders, and thermoset or thermoplastic resins. In one embodiment, the population of phase particulates of powdered feedstock material 21 includes a plurality of small second phase particles embedded within the particles of the host matrix material. In the exemplary embodiment, the plurality of small second phase particles includes any carbides, borides, nitrides, oxides, intermetallics, or topographically close-packed (TCP) phases that enable additive manufacturing system 10 to function as described herein. In another embodiment, the small second phase particles may be nucleated and/or formed during a heat treating process.

In the exemplary embodiment, pretreatment heating system 13 includes a furnace 20 configured to heat powdered feedstock material 21 and, in some embodiments, agitate powdered feedstock material 21 during the heat treating process. Agitating powdered feedstock material 21 during the heat treating process facilitates preventing powdered feedstock material 21 from sintering and/or partially combining. In exemplary embodiments, furnace 20 includes, for example, and without limitation, a rotary furnace, a tube furnace, a fluidized bed furnace, a cyclone furnace, and/or an ultrasonication device. However, furnace 20 includes any heating device that enables additive manufacturing system 10 to function as described herein. In another embodiment, feedstock material 21 may be at least partially sintered by furnace 20 and subsequently broken apart or reduced back into a powdered material. For example, and without limitation, a sintered feedstock material 21 may be subjected to post heat treatment separation using one or more milling, shatterbox, spheroidization, and/or other separation processes.

In the exemplary embodiment, powdered feedstock material 21 is placed in pretreatment heating system 13 and heated to a predetermined temperature for a predetermined amount of time by furnace 20. In one embodiment, pretreatment heating system 13 heats, for example, a Co, Fe, Ni, and Ti-based alloy powdered feedstock material to a temperature in the range between and including 700 degrees Celsius (° C.) (1292 degrees Fahrenheit (° F.)) to 1,400° C. (2552° F.). In addition, pretreatment heating system 13 maintains such a powdered feedstock material within this temperature range for a period of up to 100 hours. More specifically, pretreatment heating system 13 may be used to heat Ni and Co-based alloys to a temperature in the range between and including 800° C. (1472° F.) to 1,200° C. (2192° F.) for a period of up to 72 hours to facilitate forming and/or growing, for example, the plurality of small second phase particles including carbides, oxides, and TCP phases. Ferrous alloys, or Fi-based alloys, may be heated to a temperature in the range between and including 700° C. (1292° F.) to 1,350° C. (2462° F.) for a period of up to 100 hours to facilitate forming and/or growing, for example, the plurality of small second phase particles including carbides, oxides, and TCP phases. Moreover, Ti-based alloys may be heated to a temperature in the range between and including 900° C. (1652° F.) to 1,400° C. (2552° F.) for a period of up to 100 hours to facilitate forming and/or growing, for example, the plurality of small second phase particles including carbides and borides.

In another embodiment, pretreatment heating system 13 heats an Al-based alloy powdered feedstock material to a temperature in the range between and including 100° C. (212° F.) to 550° C. (1022° F.) for a period of up to 1000 hours to facilitate forming and/or growing, for example, the plurality of small second phase particles including oxides and borides. In addition, in another embodiment, pretreatment heating system 13 heats a refractory powdered feedstock material, such as a powdered ceramic material, to a temperature greater than 2000° C. (3632° F.) for a period of up to 1000 hours.

Heat treating powdered feedstock material 21 in pretreatment heating system 13 causes the plurality of small second phase particles to coarsen into a plurality of large second phase particles and/or generates a plurality of second phase particles that have a selected first nominal size distribution and are substantially uniformly distributed throughout powdered feedstock material 21. As described herein, the plurality of large second phase particles improves the physical characteristics of solid component 28.

In another embodiment, pretreatment heating system 13 is configured to heat treating powdered feedstock material 21 in a selected atmosphere configured to facilitate the coarsening and/or generation of the plurality of second phase particles. For example, powdered feedstock material 21 may be heat treated in an atmosphere including, for example, and without limitation, an inert, a reducing, or an oxidizing atmosphere to facilitate manipulating the volume fraction of second phase particles on the surface and within the metal powder particles. In one embodiment, powdered feedstock material 21 may be heat treated in an inert environment such as a vacuum or argon filled environment. In another embodiment, powdered feedstock material 21 may be heat treated in a reactive environment, such as a carburizing atmosphere (e.g., a gas including methane, carbon monoxide, and/or carbon dioxide).

In some embodiments, pretreatment heating system 13 is configured to selectively choose temperatures and durations of heat treatment to coarsen one or more second phase precipitates more than others, which facilitates fine tuning the final microstructure of component 28. That is, pretreatment heating system 13 selectively chooses temperatures and durations of heat treatments to facilitate coarsening carbides while maintaining the particle size of oxides. In another embodiment, pretreatment heating system 13 is configured to heat powdered feedstock material 21 to precipitate topologically close packed (TCP) phases that may be stable at higher temperatures than conventional strengthening phases like gamma prime and gamma double prime. In another embodiment, pretreatment heating system 13 is configured to heat powdered feedstock material 21 as a cleaning practice to evolve adsorbed species just prior to consolidation to facilitate improving buildability and/or physical properties of component 28, such as without limitation, strength, toughness, ductility, hardness, corrosion resistance, high/low temperature behavior, and/or wear resistance.

In the exemplary embodiment, powdered feedstock material 21 is transferred from pretreatment heating system 13 to, for example, build platform 12 by a material transfer system 23. Transfer system 23 includes a container 25 configured to transfer powdered feedstock material 21. In one embodiment, powdered feedstock material 21 is transferred container 25 in an inert environment. In the exemplary embodiment, powdered feedstock material 21 is transferred to container 25 from pretreatment heating system 13 as indicated by arrow 9 and subsequently from container 25 to build platform 12 as indicated by arrow 11. In another embodiment, transfer system 23 includes a series of conduits, pipes, or conveyors (not shown) configured to automatically transfer powdered feedstock material 21 from pretreatment heating system 13 to build platform 12. In the exemplary embodiment, powdered feedstock material 21 is at least partially melted and re-solidified during the additive manufacturing process to build solid component 28, for example, on build platform 12. In the exemplary embodiment, build platform 12 remains stationary during the build process. However, in another embodiment, build platform 12 is configured to agitate powdered feedstock material 21 to facilitate preventing sintering of powdered feedstock material 21, for example, if heat treated powdered feedstock material 21 is transferred to build platform 12 at an elevated temperature.

As shown in FIG. 1, energy device 14 is configured to generate energy beam 16 of sufficient energy to at least partially melt powdered feedstock material 21. However, energy beam 16 applies insufficient energy to powdered feedstock material 21 to completely melt the plurality of large second phase particles. As such, at least a portion of the plurality of large second phase particles persists during the fabrication of solid component 28 and is present as a processed population of phase particulates in solid component 28. The processed population of phase particulates has a second nominal size distribution that is effective to produce a selected (or nominal) grain size of solid component 28. As such, the second nominal size distribution of the large second phase particles that persists in solid component 28 facilitates a changed microstructure that facilitates, for example, large grain sizes and improved recrystallization of the alloy after post heat treatment and comparable creep behavior with respect to alloys made in a cast form.

In the exemplary embodiment, energy device 14 is a laser device, such as a neodymium-doped yttrium aluminum garnet (Nd:YAG) solid-state laser, that emits energy beam 16. In alternative embodiments, additive manufacturing system 10 includes any energy device 14 that enables additive manufacturing system 10 to function as described herein, such as one of a continuous, a modulated, a pulsed wave laser, a carbon dioxide laser, or an electron beam generator. Furthermore, although additive manufacturing system 10 is shown and described as including a single energy device 14, in some embodiments, additive manufacturing system 10 includes more than one laser device. In one embodiment, for example, additive manufacturing system 10 includes a first laser device having a first power and a second laser device having a second power different from the first laser power, or at least two laser devices having substantially the same power output. In yet other embodiments, additive manufacturing system 10 includes any combination of laser devices that enable additive manufacturing system 10 to function as described herein.

In the exemplary embodiment, energy device 14 is optically coupled to optical elements 30 and 32 that facilitate focusing energy beam 16 on build platform 12. Optical elements 30 and 32 include a beam collimator 30 disposed between energy device 14 and a scanning device 18, and, in some embodiments, an F-theta lens 32 disposed between scanning device 18 and build platform 12. In other embodiments, additive manufacturing system 10 includes any suitable type and arrangement of optical elements that provide a collimated and/or focused energy beam on build platform 12.

First scanning device 18 is configured to direct energy beam 16 across selective portions of build platform 12 to create solid component 28. In the exemplary embodiment, scanning device 18 is a galvanometer scanning device including a mirror 34 operatively coupled to a galvanometer-controlled motor 36 (broadly, an actuator). Motor 36 is configured to move (specifically, rotate) mirror 34 in response to signals received from controller 26, and thereby deflect energy beam 16 across selective portions of build platform 12. Mirror 34 includes any suitable configuration that enables mirror 34 to deflect energy beam 16 towards build platform 12. In some embodiments, mirror 34 includes a reflective coating that has a reflectance spectrum that corresponds to the wavelength of energy beam 16.

Although scanning device 18 is illustrated with a single mirror 34 and a single motor 36, scanning device 18 includes any suitable number of mirrors and motors that enable scanning device 18 to function as described herein. In one embodiment, for example, scanning device 18 includes two mirrors and two galvanometer-controlled motors, each operatively coupled to one of the mirrors. In yet other embodiments, scanning device 18 includes any suitable scanning device that enables additive manufacturing system 10 to function as described herein, such as, for example, two-dimension (2D) scan galvanometers, three-dimension (3D) scan galvanometers, and dynamic focusing galvanometers.

Computing device 24 includes a computer system that includes at least one processor (not shown in FIG. 1) that executes executable instructions to operate additive manufacturing system 10. Computing device 24 includes, for example, a calibration model of additive manufacturing system 10 and an electronic computer build file associated with a component, such as component 28. The calibration model includes, for example, and without limitation, an expected or desired melt pool size and temperature under a given set of operating conditions (e.g., a power of energy device 14) of additive manufacturing system 10. The build file includes build parameters that are used to control one or more components of additive manufacturing system 10. Build parameters include, without limitation, a power of energy device 14, a scan speed of scanning device 18, and a position and/orientation of scanning device 18 (specifically, mirror 34). In the exemplary embodiment, computing device 24 and controller 26 are shown as separate devices. In other embodiments, computing device 24 and controller 26 are combined as a single device that operates as both computing device 24 and controller 26 as each are described herein.

Controller 26 includes any suitable type of controller that enables additive manufacturing system 10 to function as described herein. In one embodiment, for example, controller 26 is a computer system that includes at least one processor and at least one memory device that executes executable instructions to control the operation of additive manufacturing system 10 based at least partially on instructions from human operators. Controller 26 includes, for example, a 3D model of component 28 to be fabricated by additive manufacturing system 10. Executable instructions executed by controller 26 include controlling the power output of energy device 14 and controlling a position and scan speed of scanning device 18.

Controller 26 is configured to control one or more components of additive manufacturing system 10 based on build parameters associated with a build file stored, for example, within computing device 24. In the exemplary embodiment, controller 26 is configured to control scanning device 18 based on a build file associated with a component to be fabricated with additive manufacturing system 10. More specifically, controller 26 is configured to control the position, movement, and scan speed of mirror 34 using motor 36 based upon a predetermined path defined by a build file associated with component 28. Controller 26 is also configured to control other components of additive manufacturing system 10, including, without limitation, energy device 14. In one embodiment, for example, controller 26 controls the power output of energy device 14 based on build parameters associated with a build file.

In the exemplary embodiment, additive manufacturing system 10 also includes a post treatment heating system 15. Solid component 28 is transferred from build platform 12 to post treatment heating system 15 by transfer system 23 as indicated by arrow 17. In the exemplary embodiment, post treatment heating system 15 includes a furnace 22 configured to heat and/or anneal solid component 28 to generate a fabricated component. Annealing includes cooling solid component 28 slowly to reduce internal stresses. During the annealing process, solid component 28 is placed in post treatment heating system 15 at a predetermined temperature. The temperature of post treatment heating system 15 is slowly reduced, allowing the fabricated component to slowly cool. Annealing improves the characteristics of the fabricated component generated from solid component 28. In certain embodiments, a fast cool from annealing temperatures may be preferred.

Figure 2:
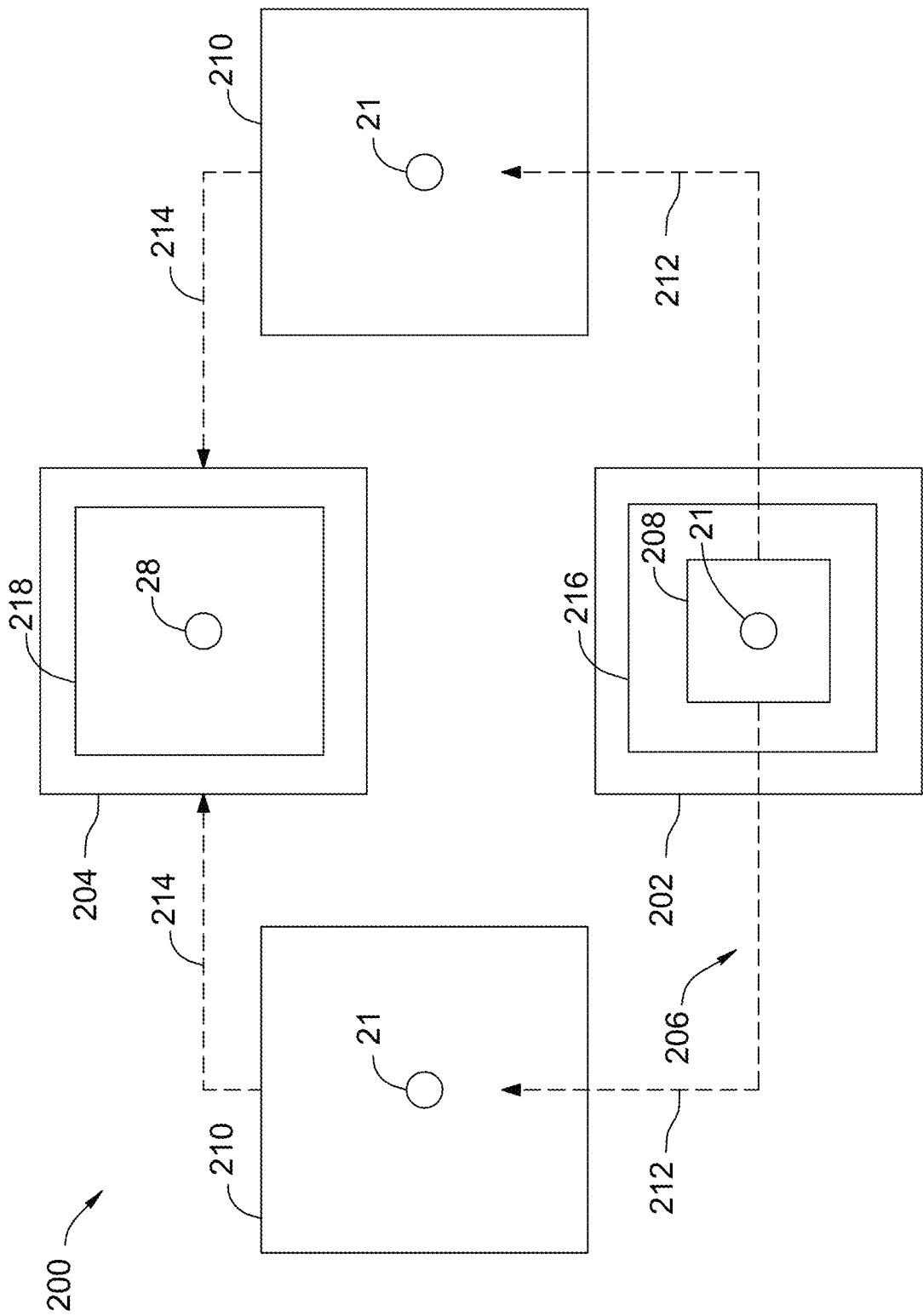
FIG. 2 is a schematic view of an exemplary additive manufacturing facility, including the additive manufacturing system shown in FIG. 1.

FIG. 2 is a schematic view of an exemplary additive manufacturing facility 200. In the exemplary embodiment, additive manufacturing facility 200 includes a centralized pretreatment heating system 202, a plurality of additive manufacturing systems 210, and a centralized post treatment heating system 204. Centralized pretreatment heating system 202 includes a furnace 216 configured to heat multiple batches of powdered feedstock material 21 and agitate powdered feedstock material 21 during the heating process. Agitating powdered feedstock material 21 during the heating process prevents powdered feedstock material 21 from sintering. Heating and agitating multiple batches of powdered feedstock material 21 at the same time improves the efficiency of additive manufacturing facility 200 and reduces the manufacturing cost of solid component 28. In the exemplary embodiment, furnace 216 includes, for example, and without limitation, a rotary furnace, a tube furnace, a fluidized bed furnace, a cyclone furnace, and/or an ultrasonication device. However, in alternative embodiments, furnace 216 includes any heating device which enables additive manufacturing system 10 to function as described herein.

In the exemplary embodiment, powdered feedstock material 21 is placed in centralized pretreatment heating system 202 and heated to a predetermined temperature for a predetermined amount of time. Centralized pretreatment heating system 202 heats, for example, a Co, Fe, Ni, and Ti-based alloy powdered feedstock material to a temperature in the range between and including 700 degrees Celsius (° C.) (1292 degrees Fahrenheit (° F.)) to 1,400° C. (2552° F.). In addition, centralized pretreatment heating system 202 maintains such a powdered feedstock material within this temperature range for a period of up to 100 hours. More specifically, centralized pretreatment heating system 202 may be used to heat Ni and Co-based alloys to a temperature in the range between and including 800° C. (1472° F.) to 1,200° C. (2192° F.) for a period of up to 72 hours to facilitate forming and/or growing, for example, the plurality of small second phase particles including carbides, oxides, and TCP phases. Ferrous alloys, or Fe-based alloys, may be heated to a temperature in the range between and including 700° C. (1292° F.) to 1,350° C. (2462° F.) for a period of up to 100 hours to facilitate forming and/or growing, for example, the plurality of small second phase particles including carbides, oxides, and TCP phases. Moreover, Ti-based alloys may be heated to a temperature in the range between and including 900° C. (1652° F.) to 1,400° C. (2552° F.) for a period of up to 100 hours to facilitate forming and/or growing, for example, the plurality of small second phase particles including carbides and borides.

In another embodiment, centralized pretreatment heating system 202 heats an Al-based alloy powdered feedstock material to a temperature in the range between and including 100° C. (212° F.) to 550° C. (1022° F.) for a period of up to 1000 hours to facilitate forming and/or growing, for example, the plurality of small second phase particles including oxides and borides. In addition, in another embodiment, centralized pretreatment heating system 202 heats a refractory powdered feedstock material, such as a powdered ceramic material, to a temperature greater than 2000° C. (3632° F.) for a period of up to 1000 hours.

Heating powdered feedstock material 21 in centralized pretreatment heating system 202 causes the plurality of small second phase particles to coarsen and/or combine into a plurality of large second phase particles and/or generates a plurality of large second phase particles that have a selected first nominal size distribution and are substantially uniformly distributed throughout powdered feedstock material 21. As described herein, the plurality of large second phase particles improves the physical characteristics of solid component 28.

Powdered feedstock material 21 is transferred from centralized pretreatment heating system 202 to at least one of additive manufacturing systems 210 by a transfer system 206. In the exemplary embodiment, transfer system 206 includes a container 208 configured to transfer powdered feedstock material 21. In some embodiments, powdered feedstock material 21 is transferred by container 208 in an inert environment. In the exemplary embodiment, powdered feedstock material 21 is transferred to container 208 which is transferred to additive manufacturing systems 210 as indicated by arrows 212.

After powdered feedstock material 21 has been processed in additive manufacturing systems 210 to fabricate solid component 28, solid component 28 is transferred from additive manufacturing systems 210 to centralized post treatment heating system 204 by transfer system 206 as indicated by arrow 214. In the exemplary embodiment, centralized post treatment heating system 204 includes a furnace 218 configured to heat and/or anneal solid component 28 to generate a fabricated component. Annealing includes cooling solid component 28 slowly to reduce internal stresses. During the annealing process, solid component 28 is placed in centralized post treatment heating system 204 at a predetermined temperature. The temperature of centralized post treatment heating system 204 is slowly reduced, allowing solid component 28 to slowly cool. Annealing improves the characteristics of the fabricated component generated from solid component 28. Annealing multiple solid components 28 at the same time improves the efficiency of additive manufacturing facility 200 and reduces the manufacturing cost of the fabricated components.

Figure 3:
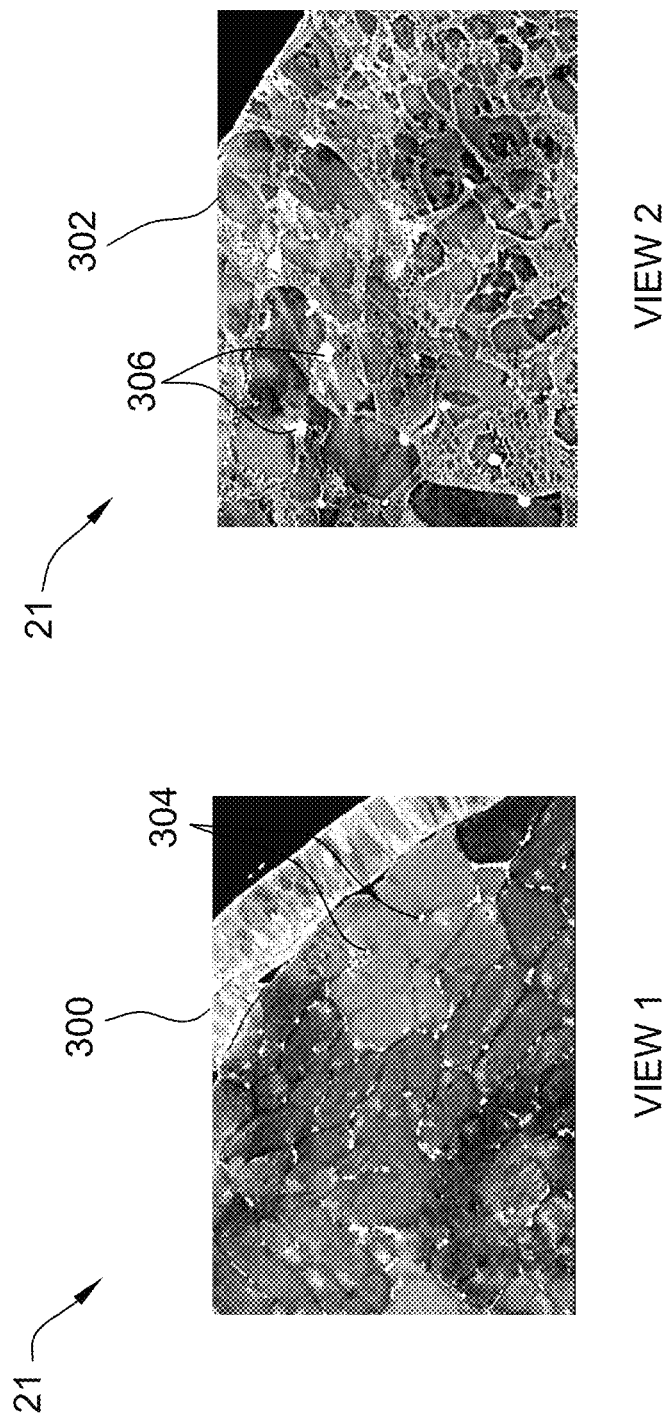
FIG. 3 is two micrographs of the microstructure of particles of a powdered feedstock material for use in the additive manufacturing system shown in FIG. 1.

FIG. 3 shows two micrographs of the microstructure of particles 300 and 302 of powdered feedstock material 21. View 1 shows an approximately 10,000 times magnification of particle 300 of powdered feedstock material 21 before pretreatment heating system 13 has heat treated powdered feedstock material 21. View 2 shows an approximately 10,000 times magnification of particle 302 of powdered feedstock material 21 after pretreatment heating system 13 has heat treated powdered feedstock material 21. In the illustrated embodiment, the microstructure of particle 300 includes a plurality of small second phase particles 304, represented by the small particles shown in View 1 dispersed within the microstructure of particle 300. In View 2, the microstructure of particle 302 of powdered feedstock material 21 includes a plurality of second phase particles 306 represented by the smaller particles shown in View 2 dispersed within the microstructure of particle 302. In the illustrated embodiment, second phase particles 304 and 306 are carbide particles. However, in alternative embodiments, second phase particles 304 and 306 includes any carbide, oxide, boride, nitride, intermetallic, or TCP phase particles that enables additive manufacturing system 10 to operate as described herein.

As illustrated in FIG. 3, second phase particles 304 in View 1 are smaller than the second phase particles 306 in View 2. In the exemplary embodiment, powdered feedstock material 21 is placed in pretreatment heating system 13 and heated to a predetermined temperature for a predetermined amount of time. Heating powdered feedstock material 21 in pretreatment heating system 13 facilitates generating and/or causing second phase particles 304 to coarsen into larger second phase particles 306. In addition, in some embodiments, heating powdered feedstock material 21 in pretreatment heating system 13 facilitates nucleating the second phase particles 304 within the powdered material. For example, in the exemplary embodiment, powdered feedstock material 21 is placed in pretreatment heating system 13 and heated to produce a mean second phase particle 306 size (or nominal size distribution) that is at least 10% larger second phase particles 304. Second phase particles 306 are well-formed and larger (e.g., at least 10% larger) than second phase particles 304. Coarser or larger second phase particles 306 are incorporated to improve the physical characteristics of solid component 28, such as, strength, toughness, ductility, hardness, corrosion resistance, high/low temperature behavior, and/or wear resistance.

Embodiments of the additive manufacturing systems with a pretreatment heating system described herein preheat a powdered feedstock material before manufacturing a component from the powdered feedstock material. The additive manufacturing system includes a pretreatment heating system, a build platform, and an energy device. The pretreatment heating system applies heat to a powdered feedstock material before the powdered feedstock material is transferred to the build platform. The energy device generates an energy beam directed to the powdered feedstock material on the build platform. The energy beam melts the powder material on the build platform in and around the area where the energy beam is incident on the powder material, resulting in a melt pool. The melt pool cools forming a layer of the component. Preheating the powdered feedstock material in the pretreatment heating system coarsens the small second phase particles into large second phase particles, for example, that are at least 10% larger particles. In the preferred embodiment, the energy beam applies insufficient energy to the powdered feedstock material to completely melt the large second phase particles resulting in the plurality of large second phase particles having a second nominal size distribution being substantially uniformly distributed throughout powdered feedstock material, resulting in a microstructure that has large grain sizes, improved recrystallization of the alloy, and comparable creep behavior with respect to alloys made in a cast form.

An exemplary technical effect of the methods and systems described herein includes: (a) preheating a powdered feedstock material; (b) generating large second phase particles within the powdered feedstock material; (c) maintaining at least a portion of the large second phase particles throughout the additive manufacturing building process; (d) post-heating a component; (e) increasing grain sizes in a component; (f) improving recrystallization of an alloy within a component; and (g) improving creep behavior within a component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having pretreatment heating systems are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of processing a powdered feedstock material including a plurality of particles to form a fabricated component, the fabricated component including a plurality of grains having a grain size, said method comprising:

heating a powdered feedstock material including a host matrix material and a population of phase particulates disposed within the host matrix material, the population of phase particulates having a first size distribution, wherein heating the powdered feedstock material increases the first size distribution of the population of phase particulates to a second size distribution disposed within the host matrix material, and wherein heating the powdered feedstock material maintains the host matrix material and the population of phase particulates as a powdered material;

building a consolidated component from the powdered feedstock material in an additive manufacturing process; and fabricating the fabricated component from the consolidated component, wherein the second size distribution of the population of phase particulates is sized such that at least a portion of the population of phase particulates persists throughout the additive manufacturing process and is present as a processed population of phase particulates in the consolidated component, and wherein the second size distribution is effective to produce the grain size of the fabricated component.

2. The method in accordance with claim 1 further comprising nucleating the phase within the powdered material.

3. The method in accordance with claim 1 further comprising atomizing a base material to generate the powdered material.

4. The method in accordance with claim 3, wherein atomizing the base material comprises processing the base material using one of inert gas atomization, water atomization, oil atomization, vacuum atomization, plasma atomization, and centrifugal atomization.

5. The method in accordance with claim 1, wherein the host matrix material comprises one or more of the following materials: aluminum (Al), cobalt (Co), iron (Fe), nickel (Ni), and titanium (Ti).

6. The method in accordance with claim 1, wherein the host matrix material comprises one of the following: an Al-based alloy, a Co-based alloy, an Fe-based alloy, a Ni-based alloy, and a Ti-based alloy.

7. The method in accordance with claim 1, wherein the population of phase particulates comprises one or more of the following: carbides, borides, nitrides, oxides, intermetallics, and topographically close-packed (TCP) phases.

8. The method in accordance with claim 1, wherein fabricating the fabricated component from the consolidated component comprises heat treating the consolidated component.

9. A method of forming a consolidated component including a plurality of grains having a grain size, said method comprising:
  atomizing a metal alloy to generate a powdered material including a host matrix material and a population of phase particulates disposed within the host matrix material, the population of phase particulates having a first size distribution;
  heat treating the powdered material to increase the first size distribution of the population of phase particulates to a second size distribution disposed within the host matrix material, wherein the heat treating maintains the host matrix material and the population of phase particulates as a powdered material;
  directing an energy beam emitted by an energy device onto a layer of the powdered material; and
  generating a melt pool in the powdered material layer with the energy beam to generate a consolidated component, wherein the energy beam applies insufficient energy to the powdered material to completely melt the population of phase particulates, and wherein the second size distribution of the population of phase particulates is effective to produce the grain size of the consolidated component.

10. The method in accordance with claim 9, wherein heat treating the powdered material comprises heat treating the powdered material to a temperature in a range between and including about 800 degrees Celsius and about 1200 degrees Celsius.

11. The method in accordance with claim 9, wherein increasing the first size distribution comprises producing a second size distribution that is at least 10% larger that the first size distribution.

12. The method in accordance with claim 9, wherein atomizing the metal alloy comprises processing the metal alloy using one of inert gas atomization, water atomization, oil atomization, vacuum atomization, plasma atomization, and centrifugal atomization.

13. The method in accordance with claim 9, wherein atomizing the metal alloy comprises atomizing one of the following: an Al-based alloy, a Co-based alloy, an Fe-based alloy, a Ni-based alloy, and a Ti-based alloy.

14. The method in accordance with claim 9, wherein the host matrix material comprises one or more of the following materials: aluminum (Al), cobalt (Co), iron (Fe), nickel (Ni), and titanium (Ti).

15. The method in accordance with claim 9, wherein the population of phase particulates comprises one or more of the following: carbides, borides, nitrides, oxides, intermetallics, and topographically close-packed (TCP) phases.

16. The method in accordance with claim 9 further comprising fabricating a fabricated component from the consolidated component.

17. The method in accordance with claim 16, wherein fabricating the fabricated component from the consolidated component comprises heat treating the consolidated component.

* * * * *